United States Patent
Gupta et al.

(10) Patent No.: US 11,105,316 B2
(45) Date of Patent: Aug. 31, 2021

(54) WIND TURBINE TEMPERATURE DEPENDENT NOISE REDUCTION

(71) Applicant: VESTAS WIND SYSTEMS A/S, Aarhus N (DK)

(72) Inventors: Mranal Gupta, Tilst (DK); Kaj Dam Madsen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 164 days.

(21) Appl. No.: 16/473,163

(22) PCT Filed: Dec. 11, 2017

(86) PCT No.: PCT/DK2017/050419
§ 371 (c)(1),
(2) Date: Jun. 24, 2019

(87) PCT Pub. No.: WO2018/113871
PCT Pub. Date: Jun. 28, 2018

(65) Prior Publication Data
US 2020/0088164 A1 Mar. 19, 2020

(30) Foreign Application Priority Data
Dec. 23, 2016 (DK) .......................... PA 2016 71040

(51) Int. Cl.
*F03D 7/02* (2006.01)
*F03D 80/60* (2016.01)
*F03D 80/80* (2016.01)

(52) U.S. Cl.
CPC ......... *F03D 7/0296* (2013.01); *F03D 7/0224* (2013.01); *F03D 80/60* (2016.05); *F03D 80/82* (2016.05)

(58) Field of Classification Search
CPC ... F03D 7/0296; F03D 80/60; F05B 2270/333
See application file for complete search history.

(56) References Cited

U.S. PATENT DOCUMENTS

| 2007/0031237 A1* | 2/2007 | Bonnet | F03D 7/048 415/1 |
| 2012/0027591 A1* | 2/2012 | Kinzie | F03D 7/0296 416/1 |

(Continued)

FOREIGN PATENT DOCUMENTS

| CN | 101907062 A | 12/2010 |
| CN | 102852719 A | 1/2013 |

(Continued)

OTHER PUBLICATIONS

PCT Written Opinion of the International Searching Authority for Application No. PCT/DK2017/050419 dated Feb. 19, 2018.

(Continued)

*Primary Examiner* — Woody A Lee, Jr.
*Assistant Examiner* — Brian Christopher Delrue
(74) *Attorney, Agent, or Firm* — Patterson + Sheridan, LLP

(57) ABSTRACT

A method of controlling noise produced by a wind turbine is disclosed. The wind turbine comprises one or more component cooling devices, and the method comprises: receiving one or more inputs indicative of noise generated by the one or more component cooling devices; determining the contribution of noise from the one or more component cooling devices to overall turbine noise based upon the one or more inputs; and modifying turbine operation based upon the contribution of cooling device noise to overall turbine noise and based upon turbine noise requirements. A corresponding wind turbine controller is also provided.

15 Claims, 3 Drawing Sheets

(56) References Cited

U.S. PATENT DOCUMENTS

| | | | |
|---|---|---|---|
| 2013/0164135 A1* | 6/2013 | Himmelmann | G10K 11/17873 416/146 R |
| 2013/0280066 A1* | 10/2013 | Scholte-Wassink | F03D 7/0244 416/1 |
| 2016/0025072 A1* | 1/2016 | Monteiro de Barros | F03D 9/25 415/121.3 |
| 2016/0265511 A1* | 9/2016 | Petersen | F03D 80/60 |
| 2019/0271295 A1* | 9/2019 | Gupta | F03D 7/0276 |
| 2020/0332767 A1* | 10/2020 | Gupta | F03D 7/0224 |
| 2020/0332768 A1* | 10/2020 | Gupta | F03D 17/00 |
| 2020/0332770 A1* | 10/2020 | Gupta | F03D 7/0296 |

FOREIGN PATENT DOCUMENTS

| | | | | |
|---|---|---|---|---|
| EP | 2273105 | A2 | 1/2011 | |
| EP | 3067555 | A1 * | 9/2016 | F01P 7/02 |
| EP | 3067555 | A1 | 9/2016 | |
| WO | 2018113871 | A1 | 6/2018 | |

OTHER PUBLICATIONS

PCT International Search Report for Application No. PCT/DK2017/050419 dated Feb. 19, 2018.

Danish Patent and Trademark Office 1st Technical Examination for Application No. PA 2016 71040 dated May 22, 2017.

* cited by examiner

WIND TURBINE TEMPERATURE DEPENDENT NOISE REDUCTION

FIELD OF INVENTION

The present invention relates to controlling noise produced by wind turbines.

BACKGROUND

Noise emission from wind turbines is a well-known problem and has been the subject of extensive work. The procedure for measuring wind turbine acoustic noise is described in the third edition of international standard IEC 61400-11.

The noise emission from a wind turbine includes both mechanical noise and aerodynamic noise. Mechanical noise includes noise driven by components within the nacelle, such as the wind turbine drivetrain. Such noise can be radiated to the surroundings directly from the surface of vibrating components (so-called airborne noise) or can be radiated to the surroundings by the wind turbine tower or blades when vibrations of components are conducted through the structure of the wind turbine (so-called structure borne noise (SBN)). Aerodynamic noise comes from the wind turbine blades and includes, for example, noise due to vortex-shedding.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and when tonal noise will be audible to wind turbine neighbours as this can depend on a wide variety of factors.

One or more cooling devices, such as cooling fans, may be included in a wind turbine to maintain operating temperatures within design limits. For example, a transformer, gearbox, power converter and/or the generator may include one or more cooling fans. A general cooling fan for the turbine nacelle environment may also be present. Such cooling fans generate noise.

In order to meet noise level requirements which may be imposed, modern wind turbines are configured to be capable of operating in Noise Reduced Operation (NRO) modes.

NRO modes reduce the sound levels produced by a turbine, usually by limiting the turbine's maximum rotor speed and power output. NRO modes are used at night, for example, when neighbours of a wind power plant may be more sensitive to turbine noise.

An object of embodiments of the present invention may be to provide a method of controlling noise output by a wind turbine.

SUMMARY OF THE INVENTION

The invention is defined in the independent claims to which reference should now be made. Preferred features are detailed in the dependent claims.

The inventors have appreciated that various wind turbine noise reduced operation modes are governed by maximum allowable sound emission. When operating in modes that heavily reduce noise, the contribution of cooling devices, such as cooling fans, to overall noise emission can become significant. Generally, in order to comply with the maximum noise levels, i.e. to avoid the noise level of the wind turbine surpassing a desired threshold, the speed of the fans would be reduced. However, this may risk the safety of some components, and result in failure due to lack of cooling.

According to a first aspect, the invention provides a method of controlling a wind turbine comprising one or more component cooling devices. The method comprises receiving one or more inputs indicative of noise generated by the one or more component cooling devices; determining the contribution of noise from the one or more component cooling devices to overall turbine noise based upon the one or more inputs; and modifying turbine operation based upon the contribution of cooling device noise to overall turbine noise and based upon turbine noise requirements.

The one or more inputs indicative of noise generated by the cooling devices correlate with the temperature of turbine components. Temperature of turbine components is therefore considered by the control system as a parameter in controlling turbine operation, rather than taking steps such as reducing cooling applied to turbine components, such as by reducing the speed of cooling fans. The turbine power production and noise emission is thus made dependent on the temperature of components. By taking component temperature as an input for determining the extent of the required noise reduction in this way ensures operational safety of the turbine and noise comfort for neighbours. Catastrophic failures are avoided due to elevated temperatures caused by lack of cooling, while at the same time fulfilling the noise output obligations of the turbine or wind power plant operator. This can be especially beneficial for turbines in noise sensitive warm climates.

Optionally modifying turbine operation comprises: one or more of increasing power output, increasing rotor speed, or varying the pitch angle of the blades, or a combination thereof, when the contribution of noise from the one or more component cooling devices decreases; and one or more of decreasing power output, reducing rotor speed, or varying the pitch angle of the blades, or a combination thereof, when the contribution of noise from the one or more component cooling devices increases.

Optionally the method further comprises: acquiring data indicative of the operating temperature of the one or more wind turbine components; and operating the one or more component cooling devices based on the operating temperature to cool one or more components.

Optionally, determining the contribution of noise from the one or more component cooling devices to overall turbine noise comprises determining the sound power level of the cooling devices as a function of the one or more inputs. Determining the sound power level of the cooling devices may comprise determining at least one current operating condition of the cooling devices from the one or more inputs and determining sound power level as a function of the operating condition and sound power level, the function being determined from: a predetermined relationship; prior measurements in a test environment; and/or prior measurements performed on a turbine.

Optionally the one or more inputs are related to the temperature of the component cooled by the one or more cooling devices. The one or more inputs may include one or more of: component temperature; turbine power; grid voltage; turbine load; ambient temperature; ambient humidity.

Optionally, the cooling devices are cooling fans. In this case, the one or more inputs may include fan speed or RPM.

Optionally the method further comprises determining if a current operational parameter of the cooling devices is associated with tonal noise from the cooling devices, and modifying turbine operation to increase rotor noise to mask the tonal noise from the cooling devices.

Optionally the method further comprises adjusting the noise generated by one or more cooling devices by adjusting one or more current operational parameters thereof in order to produce noise that mask tonal noise generated by one or more other turbine components. The method may further comprise determining that, or receiving input indicating that, tonal noise is being generated by one or more turbine components, and generating masking noise by adjusting one or more current operational parameters of the one or more cooling devices. When the cooling devices are fans, the fan speed may be varied such that the fans provide appropriate masking.

Optionally the turbine operation is modified by altering one or more of blade pitch, rotor RPM or turbine power output.

The cooling components may be associated with critical components or regions of the turbine, such as a transformer, converter or nacelle environment.

According to a second aspect of the invention, which may be used separately from, or in combination with, the first aspect, a method is provided for use in control of a wind turbine comprising one or more component cooling devices, the method comprising: calculating, based upon one or more pre-determined wind turbine site conditions, operational characteristics indicative of noise generated by the one or more component cooling devices; determining the contribution of noise from the one or more component cooling devices to overall turbine noise based upon the operational characteristics; and defining a noise reduced operation mode that restricts turbine operation based upon the contribution of cooling device noise to overall turbine noise and based upon turbine noise requirements. The noise reduced operation mode restricts one or more turbine operating parameters based upon the contribution of cooling device noise to overall turbine noise and based upon turbine noise requirements. The noise reduced mode of operation may then be used to control operation of one or more wind turbines for the site.

A controller may be provided for controlling a wind turbine or a wind power plant according to the methods described herein. A wind turbine or wind power plant may be provided comprising such a controller. A computer program which when executed on a computing device causes it to carry out the methods described herein is also provided.

The method of embodiments of the invention may in particular be implemented during low noise operation modes.

BRIEF DESCRIPTION OF THE DRAWINGS

Examples of the invention will now be described in more detail with reference to the accompanying drawing in which.

DETAILED DESCRIPTION OF PREFERRED EMBODIMENTS

Figure 1:
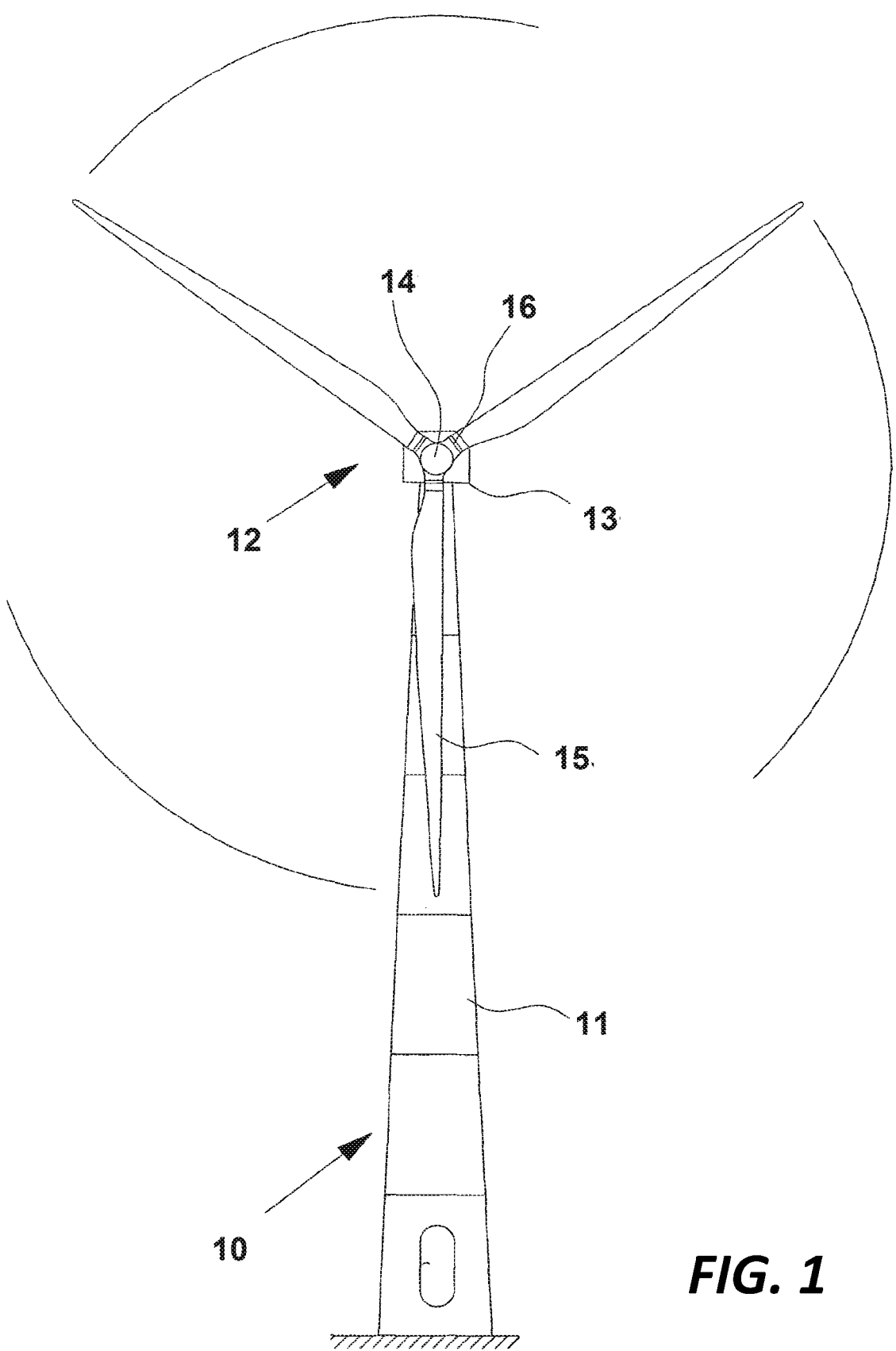
FIG. 1 illustrates a large modern wind turbine, according to one or more embodiments of the invention.

FIG. 1 illustrates a large modern wind turbine 10 as known in the art, comprising a tower 11 and a wind turbine nacelle 13 positioned on top of the tower. Wind turbine blades 15 of a turbine rotor 12 are mounted on a common hub 14 which is connected to the nacelle 13 through the low speed shaft extending out of the nacelle front. The wind turbine blades 15 of the turbine rotor 12 are connected to the hub 14 through pitch bearings 16, enabling the blades to be rotated around their longitudinal axis. The pitch angle of the blades 15 can then be controlled by linear actuators, stepper motors or other means for rotating the blades. The illustrated wind turbine 10 has three turbine blades 15, but it will be appreciated that the wind turbine could have another number of blades such as one, two, four, five or more.

The wind turbine may also include a wind turbine controller, located on or within the turbine, or at a remote location from the turbine. The controller may be communicatively coupled to any number of the components of the wind turbine in order to control them. The controller may be a computer or other suitable processing unit. For example, the controller could software that, when executed, causes the controller to perform various functions, such as receiving, transmitting and/or executing wind turbine control signals and the various method steps described herein. The controller may include a communications module to allow communications between the controller and the various components of the wind turbine. A sensor interface (e.g. one or more analogue-to-digital converters) may be included to convert sensor signals into signals that can be processed by the controller.

Figure 2:
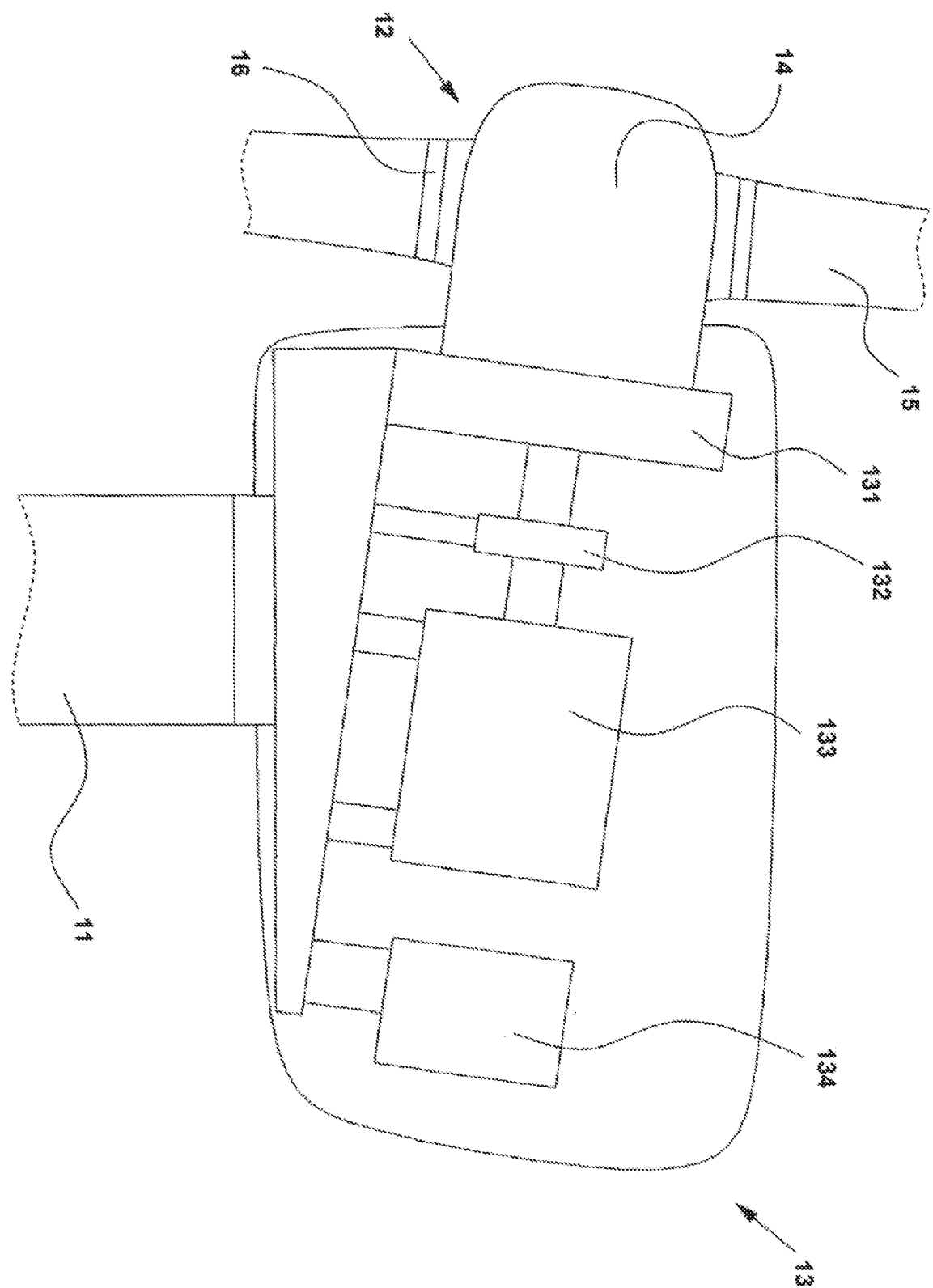
FIG. 2 illustrates a simplified cross section of a wind turbine nacelle, as seen from the side, according to one or more embodiments of the invention.

FIG. 2 illustrates a simplified cross section of an example nacelle 13 of a wind turbine 10, as seen from the side. The nacelle 13 exists in a multitude of variations and configurations but in most cases comprises one or more of following components: a gearbox 130, a coupling (not shown), some sort of braking system 131 and a generator 132. A nacelle can also include a converter 133 (also called an inverter) and additional peripheral equipment such as further power handling equipment, control cabinets, hydraulic systems, cooling systems and more.

The turbine cooling system may be comprised of one or more cooling devices, which may otherwise be known as cooling means, cooling components and so on. Various cooling devices may be configured with associated components of the wind turbine such as the generator and gearbox so as to cool these components. In particular, critical components and regions of the wind turbine may be located in the nacelle and may be provided with their own dedicated cooling devices. Critical components include converters and/or transformers, but may also include other components such as the generator and/or gearbox. In addition, or alternatively, a cooling device for the internal region of the nacelle may be provided which could provide cooling for the gear-box and generator.

The cooling devices may be cooling fans. Such fans may be configured to direct cool air across or through the internal components of the component in question in order to maintain the component temperatures within predetermined limits. The fans may be variable speed fans, the speed of the fan being increased to increase cooling effect and decreased to decrease cooling effect.

The fan speed may be controlled by the wind turbine controller, or by a separate control system. Fan speed may be controlled as a function of one or more operating parameters and conditions that correlate to component temperature. Fan speed may be controlled as a function of one or more of:

the temperature of the corresponding component that the fan is cooling;
ambient temperature;
ambient humidity;
wind turbine power level
grid voltage.

The temperature of the corresponding component that the fan is cooling may be detected by a temperature sensor associated with the component. For example, sensors may be configured to monitor a temperature of the generator and/or gearbox and/or other components. As such, the turbine controller, or a cooling system controller, can adjust the speed of at least one of the fans based on the temperature.

Where fan control is based upon an operating parameter other than a temperature measurement related to the component, this may be based upon a predetermined correlation between the parameter in question and the associated temperature of the component.

Figure 3:
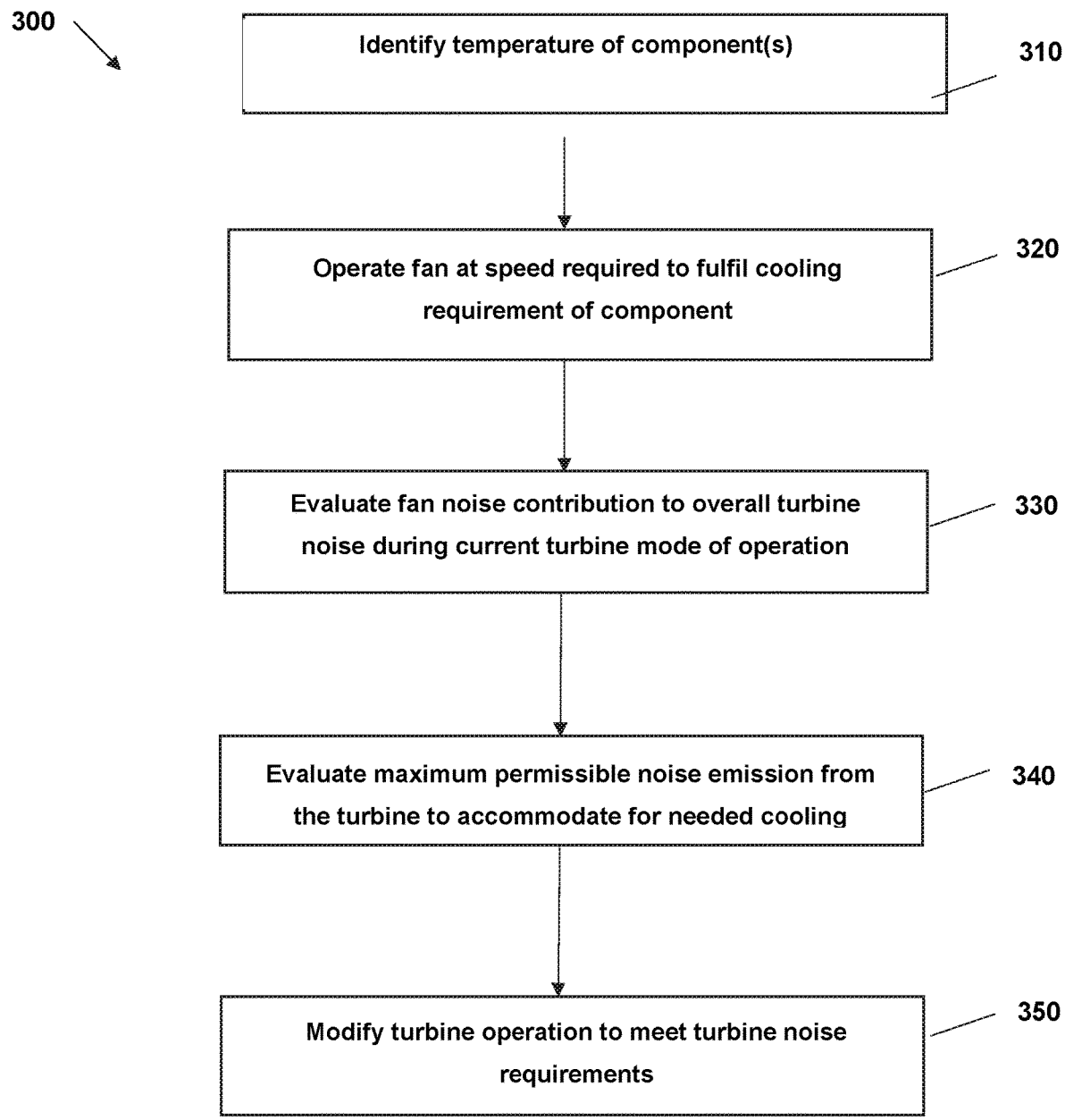
FIG. 3 illustrates an example of a method according to one or more embodiments of the invention.

FIG. 3 shows an example method 300 according to an embodiment of the invention. All or some of the various method steps may be implemented in a wind turbine controller.

At step 310 the temperature of one or more of the wind turbine components are determined. At step 320 the associated cooling fan for each component is operated at the speed/RPM required to satisfy the cooling requirements for that component. The required speed of the fan may be determined from the temperature of its associated component(s) for example. Steps 310 and 320 may be conventional steps in cooling turbine components, and may be replaced with any other suitable method of operating one or more cooling devices. These steps may be performed by the wind turbine controller, or may be performed by a different system such as a controller of a cooling system.

At step 330, the fan noise contribution to overall turbine noise in the current turbine operating mode is determined. The fan noise contribution is determined using a predetermined relationship between one or more fan or turbine operating parameters and noise output. The operating parameter is provided as an input which is operated on to determine fan noise output. Fan noise is related to the temperature of the component being cooled, so any parameter that correlates with component temperature may be used to determine fan noise. Fan noise may therefore be a function of a number of parameters, such as rpm or speed of fan, ambient and/or component temperature, ambient humidity and so on. Fan noise also correlates with turbine power or load, and grid voltage. Any of the parameters, alone or in combination, may be used.

The sound power level of the fans can be determined from the relationship between the input and fan noise. Any suitable method of determining the relationship can be used, including calculations using manufacturer data, measurements performed in a test environment and/or measurements on a turbine in the field during operation.

The sound power of the fans may, as described above, be obtained as a function of one or more of the fan speed, turbine load, turbine power, and so on. The controller may continuously or periodically monitor fan noise contribution. Fan noise contribution monitoring may be performed only when the turbine is operating in a low noise operation mode, where the noise from the cooling fans is more likely to be noticeable.

In step 340 a determination is made of the maximum permissible noise emission level from the rest of the turbine when the required cooling is taken into account. In other words, the maximum permitted noise emission level from the turbine, minus the contribution from the fans due to required cooling, is determined.

As an example, the fan noise contribution to overall turbine noise output can be determined using the following equation:

$$Lw(\text{Total}) = Lw(WTG\ \text{rest}) + Lw(\text{Fan})$$

Lw is the sound power level of a particular source. Lw (Total) represents the total sound power level of a wind turbine. Lw (Fan) represents the sound power level attributable to the fans or other cooling devices. Lw (WTG rest) represents the sound power level attributable to the rest of the wind turbine, and may in particular be the sound power level associated with the rotor and blades.

Lw (Total) should not exceed a particular value, as determined by regulation or otherwise provided. The noise generated by the fans due to cooling can be subtracted from Lw (Total) to provide the permissible sound power level of the turbine. This can then be used as a restriction on turbine operation to maintain overall noise levels below a required threshold, whilst maximising power generation, and therefore AEP.

At step 350, turbine operation is modified to meet the turbine noise requirements. In particular, the turbine operation is modified by altering one or more of blade pitch, rotor RPM or turbine power output. Rotor noise is a function of the rpm of the rotor, blade pitch, power output and so on. By controlling these operating parameters the noise of the wind turbine can be controlled to within the required levels, whilst at the same time maximising power output within this constraint. Noise levels are met without changing fan, or fan control, operations, and instead are met by changing operating parameters of the wind turbine as described herein.

The value of Lw (Total) minus Lw (Fan) therefore provides a "noise budget", or total noise level that must not be exceeded by the noise generated by the turbine. If the fan noise level is lower than normal, then the rotor can be operated at louder levels, which improves energy capture. If fan noise level is higher than normal, then the turbine controller must reduce the noise output due to the rotor. Whilst reducing the rotor noise level will reduce energy capture, the reduction will be less than alternative noise control strategies.

According to one or more embodiments, an NRO mode may be pre-defined based upon conditions of the site in which the wind turbine is located, or is to be located. Site conditions for the one or more wind turbines of a wind park may be known in advance of construction, or operation, and from these site conditions one or more parameters indicative of noise generated by the cooling devices can be derived. Derivation can be performed using existing site modeling techniques using at the turbine planning stage, for example. One or more parameters of turbine operation can then be controlled, based upon these parameters, to restrict them, such that noise produced by the turbine is maintained within predetermined levels according to the site conditions. The NRO mode may be activated dynamically when site conditions meet particular criteria, or may be always active, depending upon the site.

In particular, predetermined site conditions such as wind speed, direction, temperature, humidity (or averages of these values for example) indicate one or more parameters of turbine operation. This includes temperature and therefore noise associated with cooling device operation as described herein. A predetermined "fixed" operation mode may then be defined, taking into account both cooling device noise and noise from the other turbine components. In this operating mode, noise produced by the turbine may be reduced by controlling one or more turbine operating parameters to be within a predetermined range or below appropriate threshold values. In accordance with the methods described herein, noise may be controlled not by adjusting operation of the cooling device directly, but by adjusting other operating parameters of the wind turbine taking into account noise generated by the cooling components. For example, power production of the wind turbine in the NRO mode may be restricted to within a predetermined range, whilst allowing the cooling system to function normally. Other operating parameters as described herein may be similarly restricted. The invention may therefore provide a particular NRO mode in addition to, or as an alternative to, adaptive control.

Any embodiment of the invention may be enhanced further to cover or mask tonal noise generated by one or more turbine components. Generally tonal noise generated by one or more turbine components can be more perceptible by neighbours than broad spectrum noise, and will therefore be considered more annoying.

When the cooling devices produce tonal noise, one or more operational parameters of the turbine may be adjusted to produce appropriate masking noise. Masking noise masks another sound, making its perception, or detection, more difficult. The amount of masking may be defined as the increase (in decibels) in the detection threshold of a sound (signal) due to the presence of a masker sound. Appropriate features of masking noise required to mask tonal noise are generally known and will not be described in detail here.

Values of one or more operational parameters of the cooling devices may be associated with tonal noise from the cooling devices. This association may be generated by prior measurement, manufacturer specifications and so on, or may be measured in real time using an appropriate sound capturing device located in the near or far field relative to the turbine. When tonal noise is generated by the cooling devices the operation of the wind turbine may be adjusted to create appropriate masking noise to mask the tonal noise generated by the cooling devices. In particular, when one or more current operational parameters of one or more cooling devices have a value that is associated with tonal noise from the cooling devices, turbine operation is modified. For example rotor noise may be altered, and particularly increased, to mask the tonal noise from the cooling devices.

As a further possibility, in addition to, or as an alternative to the abovementioned masking, the cooling devices themselves may be used to mask tonal noise generated by one or more other turbine components, such as tonal noise originating from the gearbox or converter. Here one or more operating parameters of the cooling devices can be adjusted to provide appropriate masking noise for turbine components other than the cooling devices. For example, fan speed can be varied such that the fans provide the needed masking.

Fans have been used as an example of cooling devices throughout this document. It will be appreciated that other types of cooling device are compatible with embodiments of the invention. Alternatives such as water cooled, or gas cooled, systems may be used.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method of controlling a wind turbine comprising one or more component cooling devices, the method comprising:
   receiving one or more inputs indicative of noise generated by the one or more component cooling devices;
   determining a contribution of noise from the one or more component cooling devices to overall turbine noise based upon the one or more inputs;
   when the contribution of noise from the one or more component cooling devices decreases, at least one of: increasing power output, increasing rotor speed, or varying a pitch angle of blades of the wind turbine; and
   when the contribution of noise from the one or more component cooling devices increases, at least one of: decreasing power output, reducing rotor speed, or varying the pitch angle of the blades.

2. A method according to claim 1, further comprising:
   acquiring data indicative of an operating temperature of one or more wind turbine components; and
   operating the one or more component cooling devices based on the operating temperature of the one or more wind turbine components.

3. A method according to claim 1, wherein determining the contribution of noise from the one or more component cooling devices to overall turbine noise comprises determining a sound power level of the one or more component cooling devices as a function of the one or more inputs.

4. A method according to claim 3, wherein determining the sound power level of the one or more component cooling devices comprises determining at least one current operating condition of the one or more component cooling devices from the one or more inputs and determining sound power level as a function of the at least one current operating condition and sound power level, the function being determined from: a predetermined relationship; prior measurements in a test environment; or prior measurements performed on a turbine.

5. A method according to claim 1, wherein the one or more inputs are related to a temperature of a component cooled by the one or more component cooling devices.

6. A method according to claim 1, wherein the one or more inputs include one or more of:
   component temperature;
   turbine power;
   grid voltage;
   turbine load;
   ambient temperature; or
   ambient humidity.

7. A method according to claim 1, wherein the one or more component cooling devices are cooling fans, and the one or more inputs include fan speed.

8. A method according to claim 1, further comprising:
   determining if a current operational parameter of the one or more component cooling devices is associated with tonal noise from the one or more component cooling devices; and
   modifying turbine operation to increase rotor noise to mask the tonal noise from the one or more component cooling devices.

9. A method according to claim 1, further comprising adjusting noise generated by the one or more component cooling devices by adjusting one or more current operational parameters thereof in order to produce masking noise that masks tonal noise generated by one or more other turbine components.

10. A method according to claim 9, wherein the one or more component cooling devices are fans and a speed of the fans is varied to provide appropriate masking noise.

11. A method according to claim 1, further comprising:
determining that, or receiving input indicating that, tonal noise is being generated by one or more turbine components; and
generating masking noise by adjusting one or more current operational parameters of the one or more component cooling devices.

12. A method according to claim 1, wherein the one or more component cooling devices are cooling fans.

13. A method according to claim 1, wherein the one or more component cooling devices are associated with at least one of a transformer, a converter, or a nacelle environment of the wind turbine.

14. A method for use in control of a wind turbine comprising one or more component cooling devices, the method comprising:
calculating, based upon one or more pre-determined wind turbine site conditions, operational characteristics indicative of noise generated by the one or more component cooling devices;
determining a contribution of noise from the one or more component cooling devices to overall turbine noise based upon the operational characteristics;
when the contribution of noise from the one or more component cooling devices decreases, at least one of: increasing power output, increasing rotor speed, or varying a pitch angle of blades of the wind turbine; and
when the contribution of noise from the one or more component cooling devices increases, at least one of: decreasing power output, reducing rotor speed, or varying the pitch angle of the blades.

15. A wind turbine, comprising:
a tower;
a nacelle disposed on the tower;
a generator disposed in the nacelle;
a rotor attached at a first end to the generator;
a plurality of blades attached to a second end of the rotor;
one or more component cooling devices;
a controller configured to perform an operation, comprising:
receiving one or more inputs indicative of noise generated by the one or more component cooling devices;
determining a contribution of noise from the one or more component cooling devices to overall turbine noise based upon the one or more inputs;
when the contribution of noise from the one or more component cooling devices decreases, at least one of: increasing power output, increasing rotor speed, or varying a pitch angle of the plurality of blades; and
when the contribution of noise from the one or more component cooling devices increases, at least one of: decreasing power output, reducing rotor speed, or varying the pitch angle of the blades.

\* \* \* \* \*